(12) United States Patent
Oshima et al.

(10) Patent No.: US 8,141,906 B2
(45) Date of Patent: Mar. 27, 2012

(54) SADDLE-TYPE VEHICLE INCLUDING WHEEL WELL SHIELDS AND AN UNDERBODY SPLASH GUARD MEMBER

(75) Inventors: Tadashi Oshima, Saitama (JP); Kazuhito Hirai, Saitama (JP); Tetsuro Hosoda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 512 days.

(21) Appl. No.: 12/378,140

(22) Filed: Feb. 11, 2009

(65) Prior Publication Data

US 2009/0243275 A1 Oct. 1, 2009

(30) Foreign Application Priority Data

Mar. 27, 2008 (JP) ................. 2008-082962

(51) Int. Cl.
*B62D 25/16* (2006.01)
*B62D 25/18* (2006.01)
*B62D 25/20* (2006.01)

(52) U.S. Cl. ........ 280/851; 280/847; 280/848; 280/853; 280/159; 280/160; 180/69.1; 180/84; 296/198

(58) Field of Classification Search .................. 280/847, 280/848, 851, 853, 159, 160; 180/69.1, 84, 180/908; 296/198, 199
See application file for complete search history.

(56) References Cited

U.S. PATENT DOCUMENTS

| 4,773,661 A * | 9/1988 | Kosuge ........................ 280/847 |
| 2006/0197331 A1* | 9/2006 | Davis et al. .................... 280/781 |

FOREIGN PATENT DOCUMENTS

| JP | 62-16086 | 1/1987 |
| JP | 62-19437 | 2/1987 |
| JP | 63-201890 | 12/1988 |
| JP | 63201890 A1 * | 12/1988 |

* cited by examiner

*Primary Examiner* — J. Allen Shriver, II
*Assistant Examiner* — Bryan Evans
(74) *Attorney, Agent, or Firm* — Carrier Blackman & Associates, P.C.; William D. Blackman; Joseph P. Carrier (57) ABSTRACT

A saddle-type vehicle has an engine compartment protected from mud and water splash by wheel well shields and a centrally located underbody splash guard member, arranged to substantially block mud and water from splashing back toward an engine during operation of the vehicle. These splash guards are also configured to ensure a space for maintenance. The vehicle includes inner wheel well shields located respectively laterally inside of the front wheels, and an underbody splash guard member including first and second guard portions. The first guard portion provided on the underbody splash guard member is located laterally inside of the wheel well shields, and the second guard portion is located laterally inside of the first guard portion for covering a front portion of the engine.

20 Claims, 5 Drawing Sheets

SADDLE-TYPE VEHICLE INCLUDING WHEEL WELL SHIELDS AND AN UNDERBODY SPLASH GUARD MEMBER

CROSS-REFERENCE TO RELATED APPLICATIONS

The present invention claims priority under 35 USC 119 based on Japanese patent application No. 2008-082962, filed on 27 Mar. 2008. The entire subject matter of this priority document, including specification claims and drawings, is incorporated by reference herein.

BACKGROUND OF THE INVENTION

1. Technical Field of the Invention

The present invention relates to a saddle-type vehicle having wheel well shields and a centrally located underbody splash guard member for protectively covering selected underbody portions of the vehicle.

2. Background Art

A conventional ATV (all-terrain vehicle) type vehicle (saddle-type vehicle), which is capable of running on a rough road or in an off-road environment, is provided with an underbody splash guard member for covering the lower side of the vehicle, and an engine is located on top of the underbody splash guard member. The underbody splash guard member is provided with a rising plate extending over the width of the vehicle body on a front portion of the engine. This rising plate functions to receive the mud splashed by front wheels during running on a rough road, thereby preventing the engine from being muddied (see Patent Document 1, for example).

In another conventional saddle-type vehicle, opposite side portions of an engine splash guard are bent upwardly on the lower side of bar steps to protect mounting bolts or a differential case, or to easily pass over obstacles (see Patent Document 2 and Patent Document 3, for example).

[Patent Document 1]—Japanese Utility Model Laid-open No. Sho 63-201890

[Patent Document 2]—Japanese Utility Model Laid-open No. Sho 62-19437

[Patent Document 3]—Japanese Utility Model Laid-open No. Sho 62-16086

However, in the case of steering a handlebar during running on a rough road, each front wheel is turned to the right or left to cause the generation of an extra space in a wheel well, so that there is a possibility that the mud splashed from this extra space may be directed toward the engine. This possibility may be eliminated by largely forming a fender defining the wheel well to reduce a gap or space toward the engine. However, this space is required for maintenance of a differential case or a suspension arm, for example. Accordingly, the fender must be removed in performing the maintenance, resulting in lack of convenience.

SUMMARY OF THE INVENTION

It is, accordingly, an object of the present invention to provide a saddle-type vehicle which can ensure a space for maintenance, yet which includes an underbody splash guard member for blocking mud and water from splashing back toward an engine during vehicle use.

In accordance with a first aspect of the present invention, there is provided a saddle-type vehicle having a body frame, an engine mounted inside the body frame, an underbody splash guard member for covering the lower side of the body frame including the lower side of the engine, and a fender for covering the upper side to the rear side of a front wheel located on each side of the body frame in front of the engine, the saddle-type vehicle including a wheel well shield located laterally inside of the front wheel, a first guard portion provided on the underbody splash guard member and located laterally inside of the wheel well shield, and a second guard portion provided on the underbody splash guard member and located laterally inside of the first guard portion for covering a front portion of the engine.

With this arrangement, the mud splashed by the front wheel can be received by three portions, i.e., the wheel well shield, the first guard portion, and the second guard portion.

The second guard portion may have a substantially U-shaped configuration open toward the rear side of the vehicle, as viewed in top plan view.

With this arrangement, the front end and front right and left portions of the engine can be covered by the second guard portion.

The lower end of the wheel well shield may be set lower than the upper end of the first guard portion, and the upper end of the second guard portion may be set higher than the upper end of the first guard portion. Furthermore, the wheel well shield may overlap the first guard portion, and the first guard portion may overlap the second guard portion as viewed in side elevation.

With this arrangement, mud splashed inwardly from either side of the vehicle body can be reliably blocked by the wheel well shield, the first guard portion, and the second guard portion.

The front end of the wheel well shield and the front end of the first guard portion may be positioned in front the second guard portion.

With this arrangement, the mud splash entering obliquely from a wheel well defined by the fender can be received in advance by the wheel well shield and the first guard portion.

The first guard portion may be formed by bending the side portions of the underbody splash guard member upwardly.

With this arrangement, the first guard portion can be easily formed.

A mud-ejecting hole may be formed through the bottom portion of the underbody splash guard member in front of the second guard portion.

With this arrangement, the deposition of mud on the upper surface of the underbody splash guard member can be suppressed.

A front final reduction gear unit may be located in front of the wheel well shield.

With this arrangement, maintenance work such as oil change for the front final reduction gear unit can be performed without removing the wheel well shield from the vehicle body.

The saddle-type vehicle according to the present invention includes the wheel well shield located laterally inside of the front wheel, the first guard portion provided on the underbody splash guard member and located laterally inside of the wheel well shield, and the second guard portion provided on the underbody splash guard member and located laterally inside of the first guard portion for covering a front portion of the engine. Accordingly, the mud splashed by the front wheel can be received by three portions, i.e., the wheel well shield, the first guard portion, and the second guard portion, thereby reducing the amount of mud splash toward the engine. Accordingly, the size of the wheel well shield can be suppressed to a minimum required size, thereby ensuring a sufficient space or gap for maintenance.

The second guard portion has a substantially U-shaped configuration open on the rear side of the vehicle as viewed in plan. Accordingly, the front end portion including front right and front left portions of the engine can be covered by the second guard portion, thereby effectively blocking the mud splashed from the right or left side of the vehicle. Accordingly, the engine can be prevented from being muddied.

The lower end of the wheel well shield is set lower than the upper end of the first guard portion, and the upper end of the second guard portion is set higher than the upper end of the first guard portion. Furthermore, the wheel well shield overlaps the first guard portion, and the first guard portion overlaps the second guard portion as viewed in side elevation. Accordingly, the mud splash directed straight from either side of the vehicle body can be reliably blocked by the wheel well shield, the first guard portion, and the second guard portion, so that the amount of such mud splash toward the engine can be further reduced.

The front end of the wheel well shield and the front end of the first guard portion are positioned in front of the second guard portion. Accordingly, mud splash entering obliquely from the wheel well can be received in advance by the wheel well shield and the first guard portion, thereby finally reliably preventing the entry of the mud splash by the second guard portion. Further, the amount of mud to be received by the second guard portion can be reduced, thereby easing cleaning work for the inside of the vehicle.

The first guard portion is formed by upward bending the side portion of the underbody splash guard member. Accordingly, the first guard portion can be easily formed to thereby suppress a manufacturing cost of the underbody splash guard member.

The mud-ejecting hole is formed through the bottom portion of the underbody splash guard member in the front of the second guard portion. Accordingly, the deposition of mud on the upper surface of the underbody splash guard member can be suppressed to thereby simplify cleaning work for the inside of the vehicle.

The front final reduction gear unit is located in the front of the wheel well shield. Accordingly, maintenance work such as oil change for the front final reduction gear unit can be performed without removing the wheel well shield from the vehicle body. Thus, a space for maintenance can be ensured and the mud splashed by the front wheel toward the engine can be blocked.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

A selected illustrative embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention. Further, the proper viewing orientation of each drawing is the same as that of the reference numerals included therein.

Figure 1:
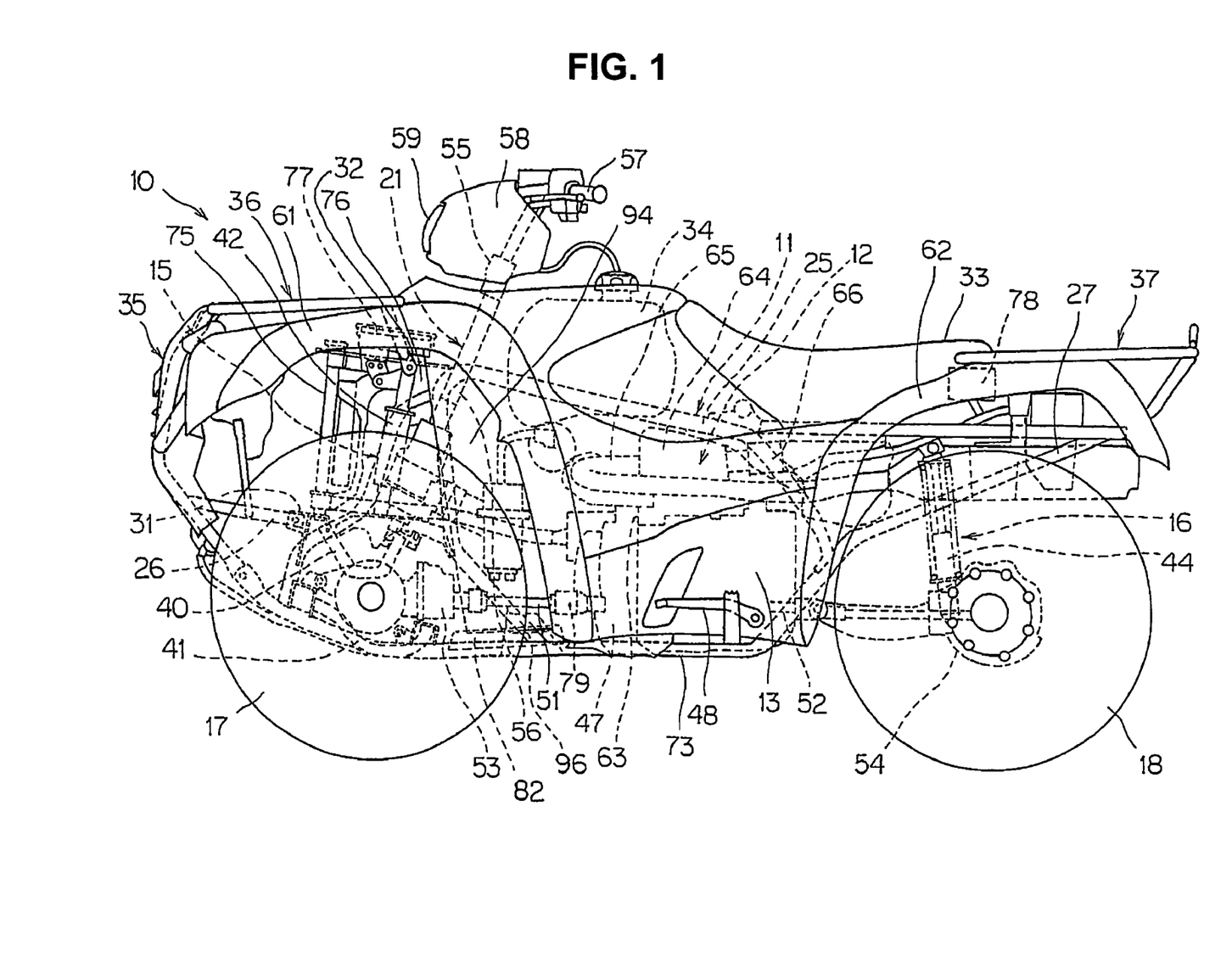
FIG. 1 is a left side elevational view of a saddle-type vehicle according to an illustrative embodiment of the present invention.

FIG. 1 is a left side elevational view of a saddle-type all terrain vehicle 10 according to an illustrative embodiment of the present invention.

The saddle-type all terrain vehicle 10 (which will be hereinafter referred to simply as "saddle-type vehicle 10") is a four-wheel drive vehicle having a body frame 11, an engine 12 mounted on the body frame 11 at a central lower portion thereof, a power transmitting unit 13 connected to the engine 12 and mounted on the body frame 11, a front suspension 15 for suspending a pair of right and left front wheels 17, a rear suspension 16 for suspending a pair of right and left rear wheels 18, and a steering unit 21 connected to the front wheels 17 and mounted on the body frame 11.

The body frame 11 has a main frame 25, a front frame 26 mounted to the front portion of the main frame 25, a rear frame 27 mounted to the rear portion of the main frame 25, a bracket 31 mounted to the right and left lower portions of the front frame 26, and a cross member 32 mounted to the right and left upper portions of the front frame 26. The vehicle 10 further includes a saddle seat 33 mounted on the main frame 25, a fuel tank 34, a front guard 35 mounted on the front frame 26, a front carrier 36 mounted on the front frame 26, and a rear carrier 37 mounted on the rear portion of the main frame 25.

The front suspension 15 is an independent suspension, which includes a pair of right and left front upper arms 40 vertically swingably mounted to the body frame 11, a pair of right and left front lower arms 41 vertically swingably mounted to the body frame 11, and a pair of right and left front shock absorbers 42 mounted between the right front upper arm 40 and the cross member 32 and between the left front upper arm 40 and the cross member 32, respectively.

The rear suspension 16 includes a rear shock absorber 44 mounted to the body frame 11.

The power transmitting unit 13 has a transmission 47 connected to an output shaft of the engine 12, a gear change pedal 48, a front drive shaft 51 connected to the front portion of the transmission 47, a rear drive shaft 52 connected to the rear portion of the transmission 47, a front final reduction gear unit 53 connected to the front drive shaft 51 and mounted on the body frame 11, and a rear final reduction gear unit 54 connected to the rear drive shaft 52.

The steering unit 21 has a steering shaft 56 mounted through a shaft holder 55 to a front upper portion of the main frame 25, and a handlebar 57 mounted to the steering shaft 56. A headlight 59, for illuminating an area in front of the vehicle body, is mounted on the front of the handlebar 57. The headlight 59 is covered with a headlight cover 58.

The vehicle 10 has a front fender 61 for covering the upper side of each front wheel 17 and a rear fender 62 for covering the upper side of each rear wheel 18.

The engine 12 is a four-stroke engine, which includes a cylinder block 63, a cylinder head 64 mounted on the upper portion of the cylinder block 63, an exhaust device 65 connected to the front portion of the cylinder head 64, and a throttle body 66 mounted on the rear portion of the cylinder head 64. A valve train is provided in the cylinder head 64. A piston is movably inserted in the cylinder block 63, and this piston is connected through a connecting rod to a crankshaft.

An underbody splash guard member 73 is provided under the engine 12, for covering a large area at the lower side of the vehicle body.

A radiator 75, for cooling the engine 12, is provided in front of the steering shaft 56. A frame 76 for supporting the radiator 75 extends frontward of the steering shaft 56, and an ECU 77 (electronic control unit) is mounted on the frame 76 at a position behind and above the radiator 75. Further, a battery 78 is mounted on the rear portion of the vehicle body. The ECU 77 and the battery 78 are connected to each other through a harness, thereby supplying electric power to the ECU 77.

Figure 2:
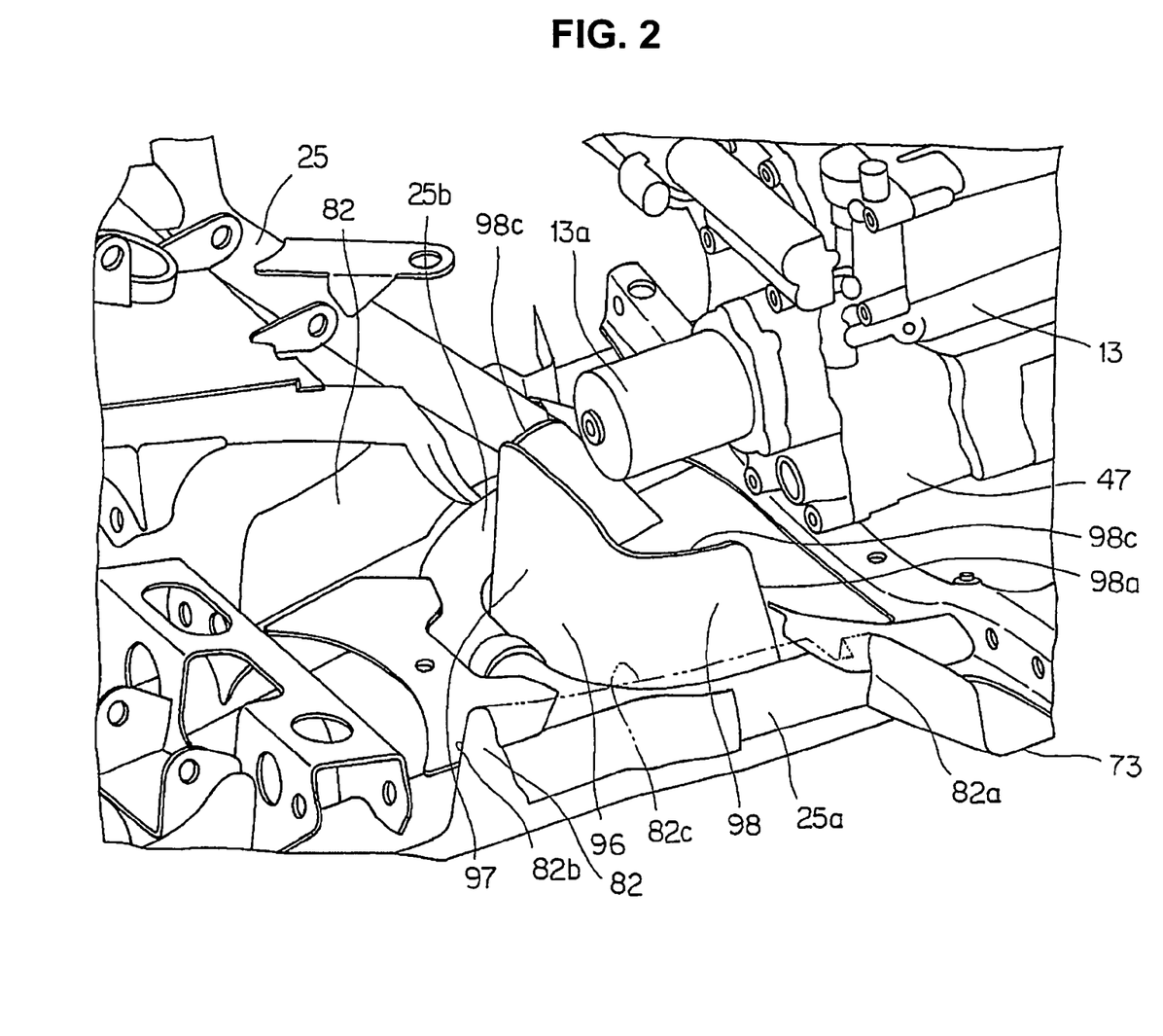
FIG. 2 is a detail perspective view of an interior portion of the vehicle of FIG. 1, showing the positional relation between an underbody splash guard member and an engine.
Figure 3:
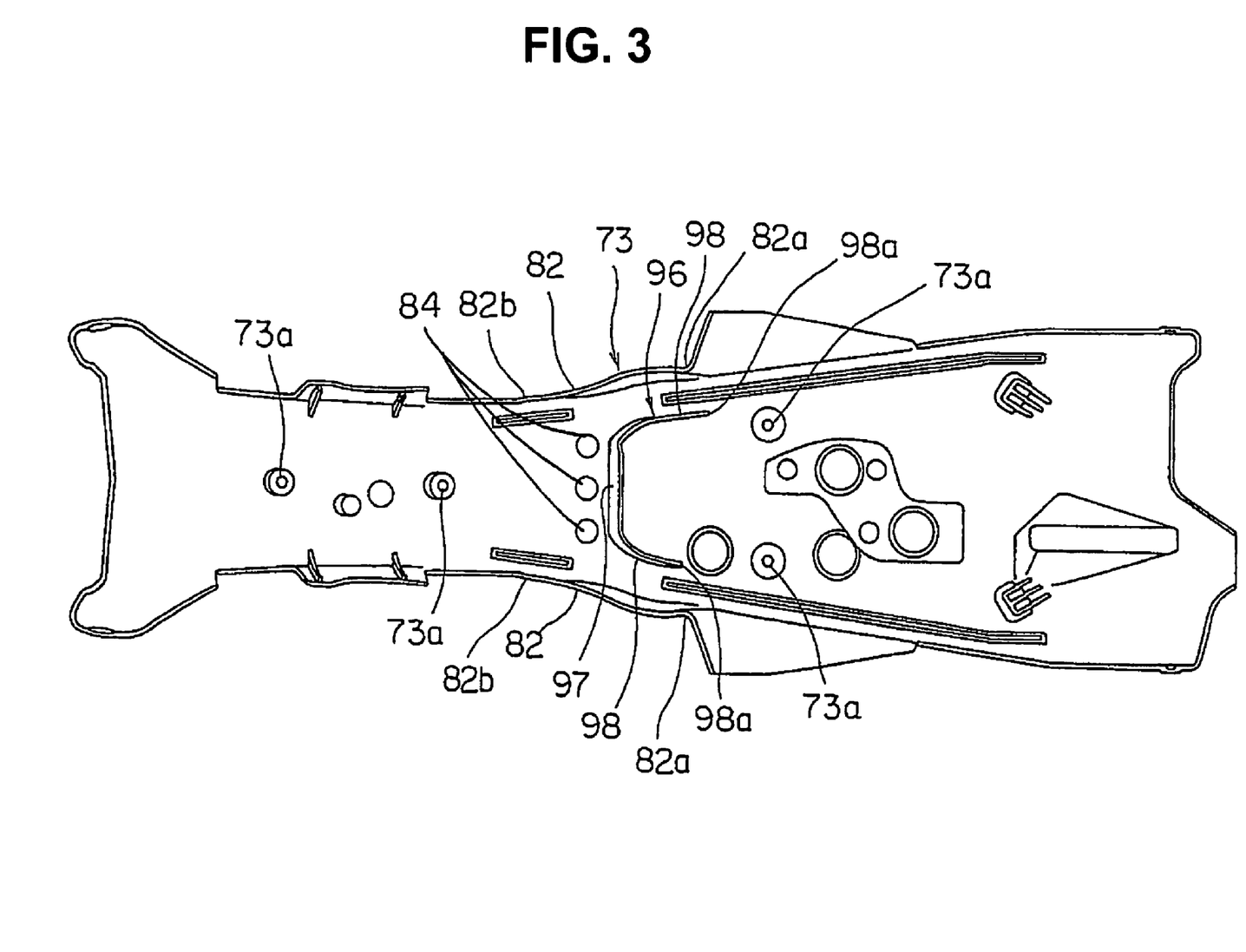
FIG. 3 is a top plan view of the underbody splash guard member of FIG. 2.

FIG. 2 is a perspective view showing the positional relation between the underbody splash guard member 73 and the power transmitting unit 13, and FIG. 3 is a top plan view of the underbody splash guard member 73.

As shown in FIG. 2, the power transmitting unit 13 is mounted inside the main frame 25. A front output shaft 13a projects forwardly in the vehicle body from the front end of the power transmitting unit 13. The front drive shaft 51 (see FIG. 1) is flexibly connected through a universal joint 79 to the front output shaft 13a. The underbody splash guard member 73 is mounted on the lower side of the power transmitting unit 13.

The underbody splash guard member 73 is integrally formed by resin molding. As shown in FIG. 3, the underbody splash guard member 73 extends in the longitudinal direction of the vehicle body, and covers the lower side of the front frame 26 and the lower side of the main frame 25, thus functioning to protect substantially the entire lower side of the vehicle body. A rear portion of the underbody splash guard member 73 under the main frame 25 extends substantially horizontally along the bottom portion of the vehicle body, and a front portion of the underbody splash guard member 73 under the front frame 26 is gently curved upwardly along the bottom portion of the front frame 26. The underbody splash guard member 73 is formed with a plurality of mounting holes 73a therein, for use in mounting the underbody splash guard member 73 to the body frame 11.

As shown in FIGS. 2 and 3, the underbody splash guard member 73 is provided with a vertical wall portion 96 (second or central guard portion) for covering a front portion of the power transmitting unit 13, and a pair of side wall portions 82 (first or outer guard portions) formed by bending the right and left side portions of the underbody splash guard member 73 upwardly. In FIG. 2 (and FIG. 4 to be hereinafter referred to), the side wall portions 82 are partially omitted, with the edges thereof shown by a phantom line.

As shown in FIG. 2, the vertical wall portion 96 is located between a left lower frame section 25a and a right lower frame section 25b, which make up a lower portion of the main frame 25. More specifically, the left lower frame section 25a and the right lower frame section 25b are joined together at their front ends so as to form a substantially U-shaped configuration as viewed in top plan view, and the vertical wall portion 96 is nestingly located inside the left and right lower frame sections 256a and 25b so as to also have a substantially U-shaped configuration as viewed in plan view, such that the front portion of the vertical wall portion 96 is disposed proximate to the joined portion of the left and right lower frame sections 256a and 25b and that the rear portion of the vertical wall portion 96 is open. That is, as shown in FIGS. 2 and 3, the vertical wall portion 96 includes a front portion 97 having a substantially flat surface facing towards the front of the vehicle body, and a pair of side portions 98 extending rearwardly from the right and left ends of the front portion 97, respectively. The front portion 97 continues smoothly to each side portion 98 so as to form a round shape following the round shape of the front curved portion of each of the left and right lower frame sections 256a and 25b.

The front portion 97 of the vertical wall portion 96 has a function of blocking mud splashed from the front lower side of the vehicle body to thereby prevent the power transmitting unit 13 from being muddied. Further, as shown in FIG. 3, the bottom portion of the underbody splash guard member 73 in front of the front portion 97 of the vertical wall portion 96 is formed with a plurality of mud-ejecting holes 84 therein, for ejecting mud striking against the front portion 97, bouncing off of the front portion, and dropping toward the lower side of the underbody splash guard member 73. While each mud-ejecting hole 84 is circular as shown in FIG. 3, it may be rectangular. Alternatively, if desired, these plural mud-ejecting holes 84 may be replaced by one elliptical hole elongated in the lateral direction of the underbody splash guard member 73.

The right and left side portions 98 of the vertical wall portion 96 function to block the mud splashed from the spaces around the front wheels 17 turned to the right or left (side spaces in the wheel wells) in the case of steering the handlebar 57 of the vehicle 10, thereby preventing the power transmitting unit 13 from being muddied. The rear end 98a of each side portion 98 extends to the front of the power transmitting unit 13 in the longitudinal direction of the vehicle body, so as to slope downwardly from the upper side to the lower side thereof, as it extends toward the rear end of the vehicle body.

As shown in FIGS. 2 and 3, the right and left side wall portions 82 are located laterally outside of the body frame 11, and they are formed by bending the right and left side portions of the underbody splash guard member 73 upwardly. The side wall portions 82 extend in the longitudinal direction of the vehicle body. As shown in FIG. 3, the rear end 82a of each side wall portion 82 is located on the rear side of the rear end 98a of each side portion 98 of the vertical wall portion 96. The rear end 82a of each side wall portion 82 is bent outward in the lateral direction of the vehicle body. The front end 82b of each side wall portion 82 extends in front of the front portion 97 of the vertical wall portion 96. Further, the upper end 98c of each side portion 98 of the vertical wall portion 96 is higher than the upper end 82c of each side wall portion 82.

Figure 4:
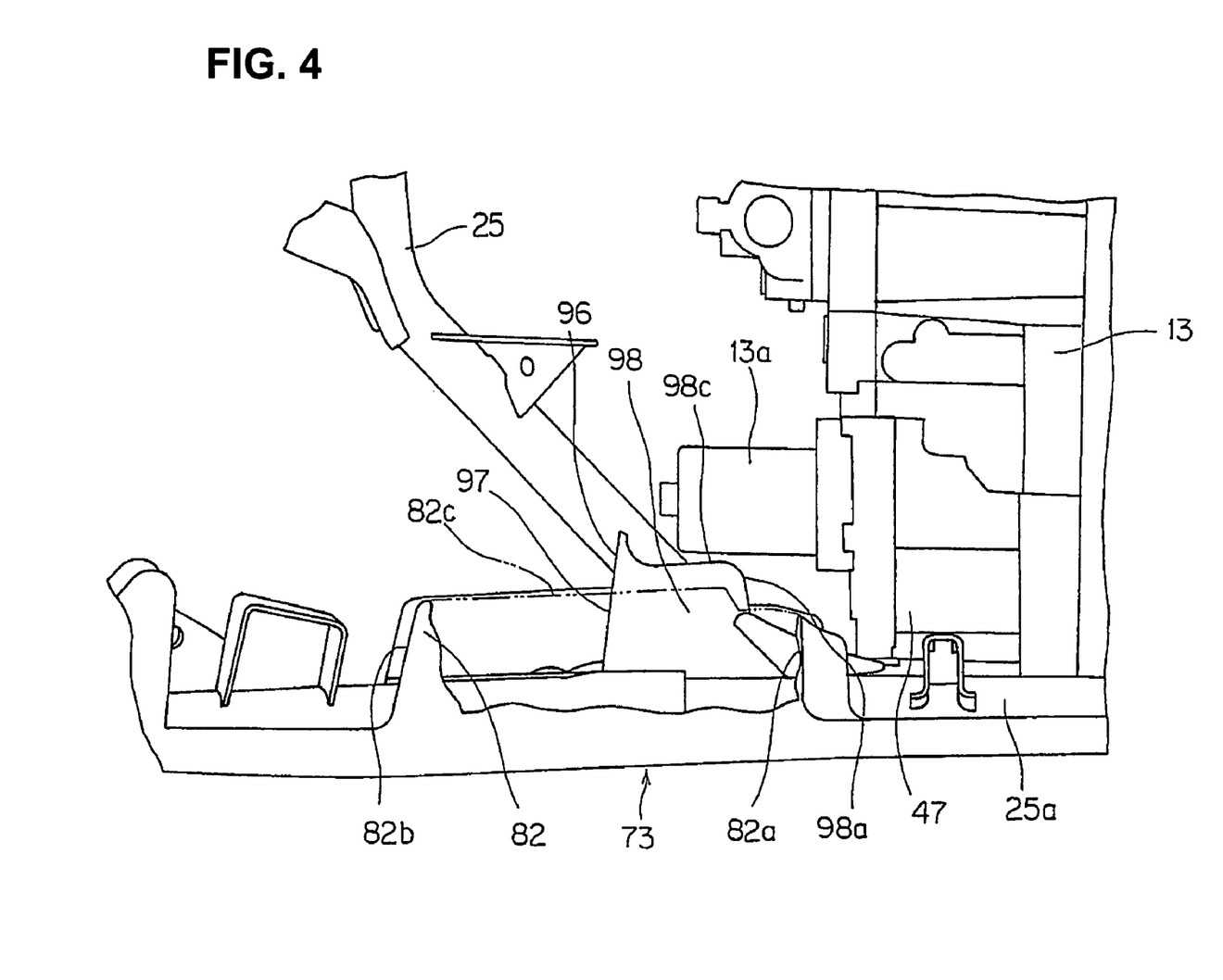
FIG. 4 is a left side environmental view of the underbody splash guard member of FIG. 2, shown in an installed configuration.

FIG. 4 is a left side environmental view of the splash guard of FIG. 2, shown in an installed configuration thereof. As apparent from FIG. 4, the upper end 98c of each side portion 98 of the vertical wall portion 96 is slightly lower than the lower end of the front output shaft 13a. The height of the front portion 97 of the vertical wall portion 96 is set so as not to interfere with the universal joint 79 and the front drive shaft 51. More specifically, the upper end of the front portion 97 is higher than the upper end 98c of each side portion 98, and slightly higher than the lower end of the front output shaft 13a. The right and left side portions 98 may have the same height as one another or may have different heights, depending upon the layout of other peripheral parts.

On the other hand, the upper end 82c of each side wall portion 82 is lower than the upper end 98c of each side portion 98 of the vertical wall portion 96. Further, each side wall portion 82 has a length such that it covers the whole of the vertical wall portion 96 in the longitudinal direction of the vehicle body.

Figure 5:
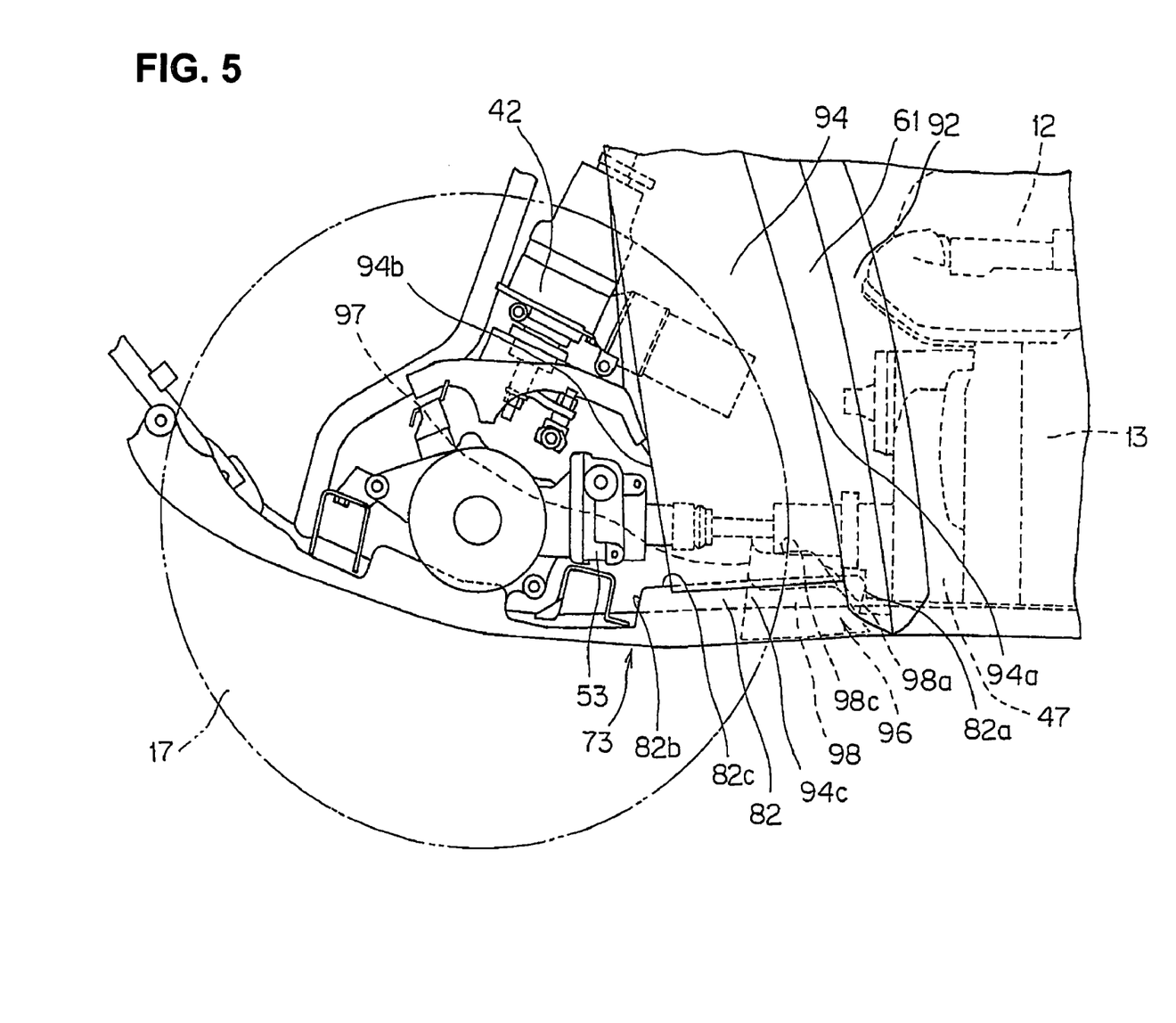
FIG. 5 is an enlarged side view of a front wheel well portion of the vehicle.

FIG. 5 is a side view of a front wheel well 90 portion of the vehicle, for each front wheel 17. The wheel well 90 is formed around each front wheel 17 as a space for allowing the pivotal right or left turning of each front wheel 17 in response to steering of the handlebar 57. Not only each front wheel 17, but also each front brake (not shown), the front suspension 15 (each front shock absorber 42, each front upper arm 40, and each front lower arm 41), and the front final reduction gear unit 53 are accessible from the corresponding wheel well 90. Accordingly, the wheel well 90 serves also as a space for maintenance work around each front wheel 17 (e.g., mounting and demounting of each front wheel 17, changing of a differential oil, and replacement of a brake shoe).

As shown in FIG. 5, the wheel well 90 is defined by the front fender 61 and a mudguard 92 for each front wheel 17.

The front fender 61 is provided at each side portion of a body cover for covering the front portion of the vehicle body. The front fender 61 is so formed as to cover the upper side to the rear side of each front wheel 17. That is, the front fender 61 has such a shape that it is curved along the shape of each front wheel 17 as viewed in side elevation.

Each front fender 61 is integrally formed with an inner wheel well shield 94 (wheel well shield) as a laterally inside portion having a flat surface oriented outward in the lateral direction of the vehicle body. As shown in FIG. 5, the inner wheel well shield 94 extends over the length of a rear portion of each front fender 61 extending on the upper side to the rear side of the inner wheel well shield 94. The flat surface of the inner wheel well shield 94 extends from each front fender 61 toward a front axle of each front wheel 17.

The mudguard 92 is arranged laterally outside of each front fender 61, so that the upper side to the rear side of each front wheel 17 is fully covered by the corresponding front fender 61 and the corresponding mudguard 92.

As shown in FIG. 5, the lower end 94c of each inner wheel well shield 94 is positioned on the lower side of the upper end 82c of each side wall portion 82 of the underbody splash guard member 73 as viewed in side elevation.

The rear end 94a of each inner wheel well shield 94 is positioned on the rear side of the rear end 98a of each side portion 98 of the vertical wall portion 96 and positioned in front of the rear end 82a of each side wall portion 82 as viewed in side elevation.

Each of the wheel well shields 94 includes a lower front end portion 94b that is disposed between the front wheels 17. The front end 94b of each inner wheel well shield 94 is disposed rearwardly of an axle of a corresponding one of the front wheels 17, is positioned in front of the front portion 97 of the vertical wall portion 96, and is also positioned on the rear side of the front end 82b of each side wall portion 82 as viewed in side elevation.

Further, each inner wheel well shield 94, each side wall portion 82, and the vertical wall portion 96 are arranged in such a manner that each inner wheel well shield 94 overlaps each side wall portion 82 and that each side wall portion 82 overlaps the vertical wall portion 96.

As shown in FIG. 5, each front brake (not shown), the front suspension 15 (each front shock absorber 42, each front upper arm 40, and each front lower arm 41), and the front final reduction gear unit 53 are provided in front of the front end 94b of each inner wheel well shield 94. Accordingly, maintenance work or the like can be performed in front of each inner wheel well shield 94, without any interference therefrom.

The operation of the saddle-type vehicle equipped with shielding structure according to the present invention will now be described.

In the case that the saddle-type vehicle 10 runs straight on a rough road or the like, the mud splashed by each front wheel 17 is blocked by each front fender 61 and each mudguard 92 and dropped to the lower side of the vehicle. Even when mud is splashed in the lateral direction of each front wheel 17, the amount of such mud splash is small and it can be almost blocked by the inner wheel well shield 94 of each front fender 61, so that the mud splashed by each front wheel 17 hardly reaches the power transmitting unit 13 and the engine 12.

In the case of turning the vehicle 10 during running on a rough road (i.e., in the case of steering the handlebar 57 to turn each front wheel 17 to the right or left), a large space or gap is generated between each front wheel 17 and the corresponding inner wheel well shield 94 in the corresponding wheel well 90. In this case, the mud splashed by each front wheel 17 is blocked by the corresponding inner wheel well shield 94.

More specifically, the mud splashed toward the lower end 94c of each inner wheel well shield 94 strikes against each inner wheel well shield 94 and is dropped to the lower side of the vehicle body. The mud splashed toward the lower side of the lower end 94c almost strikes against each side wall portion 82 because the lower end 94c of each inner wheel well shield 94 is lower than the upper end 82c of each side wall portion 82. Thereafter, the mud is dropped from each side wall portion 82 to the lower side of the vehicle body. A small amount of mud splashed beyond the upper end 82c of each side wall portion 82 toward the laterally inside area of the vehicle body almost strikes against each side portion 98 of the vertical wall portion 96 because the upper end 98c of each side portion 98 is higher than the upper end 82c of each side wall portion 82. Thereafter, the mud is dropped from each side portion 98 to the lower side of the vehicle body.

The mud splashed from in front of each inner wheel well shield 94 is restricted in entrance angle by the inner wheel well shields. That is, the amount of mud splash from an area in front of each inner wheel well shield 94 which is admitted to pass toward the power transmitting unit 13 and the engine 12 can be reduced. A small amount of mud splashed from the front of each inner wheel well shield 94 strikes against the front portion 97 and each side portion 98 of the vertical wall portion 96, and is dropped on to the underbody splash guard member. In particular, mud striking against the front portion 97 falls downwardly, and is subsequently ejected through the mud-ejecting holes 84 to the ground below the vehicle body.

According to the illustrative embodiment of the invention, the saddle-type vehicle 10 includes the inner wheel well shield 94 located laterally inside of each front wheel 17, the side wall portion 82 provided on the underbody splash guard member 73 and located laterally inside of the inner wheel well shield 94, and the vertical wall portion 96 provided on the underbody splash guard member 73 and located laterally inside of the side wall portion 82 for covering a front portion the engine 12 and the power transmitting unit 13. Accordingly, the mud splashed by each front wheel 17 can be received by three portions, i.e., the inner wheel well shield 94, the side wall portion 82, and the vertical wall portion 96, thereby reducing the amount of mud splash toward the engine 12 and the power transmitting unit 13. Accordingly, the size of the inner wheel well shield 94 can be suppressed to a minimum required size, thereby ensuring a sufficient space or gap for maintenance work in each wheel well 90.

The vertical wall portion 96 has a substantially U-shaped configuration open on the rear side of the vehicle as viewed in plan. Accordingly, the front end as well as right and left front portions of the engine 12 and the power transmitting unit 13 can be covered by the vertical wall portion 96, thereby effectively blocking mud splashed from the right or left side of the vehicle. Accordingly, the engine 12 and the power transmitting unit 13 can be substantially prevented from becoming splashed with mud.

The lower end of the inner wheel well shield 94 is set lower than the upper end of the side wall portion 82, and the upper end of the vertical wall portion 96 is set higher than the upper end of the side wall portion 82. Furthermore, the inner wheel well shield 94 overlaps the side wall portion 82, and the side wall portion 82 overlaps the vertical wall portion 96 as viewed in side elevation. Accordingly, the mud splash directed straight from either side of the vehicle body can be reliably blocked by the inner wheel well shield 94, the side wall portion 82, and the vertical wall portion 96, so that the amount of such mud splash toward the engine 12 and the power transmitting unit 13 can be further reduced.

The front end 94b of the inner wheel well shield 94 and the front end 82b of the side wall portion 82 are both positioned in front of the front portion 97 of the vertical wall portion 96. Accordingly, mud splash entering obliquely from the wheel well 90 can be received in advance by the inner wheel well shield 94 and the side wall portion 82, thereby finally reliably preventing the entry of the mud splash by the vertical wall portion 96. Further, the amount of mud to be received by the vertical wall portion 96 can be reduced, thereby easing cleaning work on the inside of the vehicle.

The side wall portion 82 is formed by bending the side portion of the underbody splash guard member 73 upwardly. Accordingly, the side wall portion 82 can be easily formed to thereby keep a manufacturing cost of the underbody splash guard member 73 at a minimum.

The mud-ejecting holes 84 are formed through the bottom portion of the underbody splash guard member 73 in front of the vertical wall portion 96. Accordingly, the deposition of mud on the upper surface of the underbody splash guard member 73 can be suppressed to thereby easing cleaning work for the inside of the vehicle.

The front final reduction gear unit 53 is located in front of the inner wheel well shield 94. Accordingly, maintenance work such as oil change for the front final reduction gear unit 53 can be performed without removing the inner wheel well shield 94 from the vehicle body. Thus, a space for maintenance can be ensured and the mud splashed by each front wheel 17 toward the engine 12 and the power transmitting unit 13 can be blocked.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. For example, while the underbody splash guard member 73 is integrally formed by resin molding in this embodiment, each side wall portion 82 and the vertical wall portion 96 may be formed separately from the underbody splash guard member 73. Further, the underbody splash guard member 73 may be formed by sheet metal working. Also in these cases, the underbody splash guard member 73 can be provided with each side wall portion 82 and the vertical wall portion 96, thereby ensuring a space for maintenance and blocking the mud splash toward the engine in steering the vehicle. All such modifications, which are within the scope of the claims, are intended to be within the scope and spirit of the present invention.

What is claimed is:

1. A saddle-type vehicle having a body frame, an engine mounted inside said body frame, a pair of spaced-apart front wheels operatively attached to said body frame, each of said front wheels being rotatable about a corresponding axle, and left and right fenders located in front of said engine on each side of said body frame for respectively covering upper and rear side portions of left and right front wheels, said saddle-type vehicle comprising:
   a wheel well shield located laterally inside each of said front wheels, said wheel well shield having a lower front edge portion disposed between said front wheels and situated rearwardly of an axle of a corresponding one of said front wheels;
   an underbody splash guard member for covering the lower side of said body frame and the lower side of said engine, said underbody splash guard member comprising a respective outer guard portion located laterally inside of a corresponding one of said wheel well shields on each side of said splash guard member, and a central guard portion located laterally between the outer guard portions, said central guard portion configured and arranged for covering a front portion of said engine.

2. The saddle-type vehicle according to claim 1, wherein said central guard portion is configured and arranged to shield the front portion of the engine from mud splashed upwardly and rearwardly from the front wheels, and has a substantially U-shaped configuration open towards the rear of the vehicle.

3. The saddle-type vehicle according to claim 1, wherein:
   the lower end of said wheel well shield is set lower than the upper end of said outer first guard portion;
   the upper end of said central guard portion is set higher than the upper end of said outer guard portions; and
   said wheel well shield overlaps said outer guard portions, and said outer guard portions overlap said central guard portion as viewed from a side view thereof.

4. The saddle-type vehicle according to claim 1, wherein the front ends of said wheel well shields and the front ends of said outer guard portions are positioned in front of said central guard portion.

5. The saddle-type vehicle according to claim 1, wherein said outer guard portions are formed by bending side portions of said underbody splash guard member upwardly.

6. The saddle-type vehicle according to claim 1, wherein a mud-ejecting hole is formed through a bottom portion of said underbody splash guard member in front of said central guard portion.

7. The saddle-type vehicle according to claim 1, wherein a front final reduction gear unit is located in front of said wheel well shield.

8. The saddle-type vehicle according to claim 1, wherein the body frame comprises left and right lower frame sections which are disposed behind the front wheel axles and joined together at front ends thereof so as to form a substantially U-shaped configuration as viewed in top plan view, and the central guard portion is nestingly located behind the joined front ends of the left and right lower frame sections and is formed so as to also have a substantially U-shaped configuration as viewed in top plan view, such that the front portion of the central guard portion is disposed proximate to the joined portion of the left and right lower frame sections.

9. In an all-terrain vehicle having a body frame, an engine mounted inside said body frame, left and right front wheels located in front of said engine on each side of said body frame, each of said front wheels being rotatable about a corresponding axle, and left and right fenders located in front of said engine on each side of said body frame for respectively covering upper and rear side portions of the left and right front wheels, the improvement comprising:
   a respective wheel well shield located laterally inside each of said front wheels, said wheel well shield having a front edge portion disposed between said front wheels and situated rearwardly of an axle of a corresponding one of said front wheels; and an underbody splash guard member covering the lower side of said body frame and the lower side of said engine, said underbody splash guard member comprising a pair of opposed side walls extending upwardly on opposite sides thereof and located laterally inside of the respective wheel well shields; and a vertical wall portion located laterally inside of said opposed side walls for covering a front portion of said engine.

10. The saddle-type vehicle according to claim 9, wherein said vertical wall portion has a substantially U-shaped configuration open towards the rear of the vehicle.

11. The saddle-type vehicle according to claim 9, wherein:
the lower end of said wheel well shield is set lower than the upper ends of said opposed side walls;
the upper end of said vertical wall portion is set higher than the upper end of said opposed side walls; and
said wheel well shield overlaps said opposed side walls, and one of said opposed side walls partially overlaps said vertical wall portion as viewed in side elevation.

12. The saddle-type vehicle according to claim 9, wherein the front end of said wheel well shield and the front ends of said opposed side walls are positioned in front of said vertical wall portion.

13. The saddle-type vehicle according to claim 9, wherein each of said opposed side walls is formed by bending a side portion of said underbody splash guard member upwardly.

14. The saddle-type vehicle according to claim 9, wherein a mud-ejecting hole is formed through a bottom portion of said underbody splash guard member in front of said vertical wall portion.

15. The saddle-type vehicle according to claim 9, wherein a front final reduction gear unit is located in front of said wheel well shield.

16. The saddle-type vehicle according to claim 9, wherein the body frame comprises left and right lower frame sections which are disposed behind the front wheel axles and joined together at front ends thereof so as to form a substantially U-shaped configuration as viewed in top plan view, and the vertical wall portion is nestingly located behind the joined front ends of the left and right lower frame sections and is formed so as to also have a substantially U-shaped configuration as viewed in top plan view, such that the front portion of the vertical wall portion is disposed proximate to the joined portion of the left and right lower frame sections.

17. In an all-terrain vehicle having a body frame, an engine mounted inside said body frame, left and right front wheels located in front of said engine on each side of said body frame, each of said front wheels being rotatable about a corresponding axle, and left and right fenders located in front of said engine on each side of said body frame for respectively covering upper and rear side portions of the left and right front wheels, the improvement comprising:

an underbody splash guard member covering the lower side of said body frame and the lower side of said engine; and a respective wheel well shield located laterally inside each of said front wheels, said wheel well shield having a front edge portion disposed between said front wheels and situated rearwardly of an axle of a corresponding one of said front wheels, said underbody splash guard member comprising:

a pair of opposed side walls extending upwardly on opposite sides of said underbody splash guard member and located laterally inside of the respective wheel well shields; and a vertical wall portion located laterally inside of said opposed side walls for covering a front portion of said engine, wherein said vertical wall portion has a substantially U-shaped configuration open towards the rear of the vehicle.

18. The saddle-type vehicle according to claim 17, wherein a mud-ejecting hole is formed through a bottom portion of said underbody splash guard member in front of said vertical wall portion.

19. The saddle-type vehicle according to claim 17, wherein a front final reduction gear unit is located in front of said wheel well shield.

20. The saddle-type vehicle according to claim 17, wherein the body frame comprises left and right lower frame sections which are disposed behind the front wheel axles and joined together at front ends thereof so as to form a substantially U-shaped configuration as viewed in top plan view, and the vertical wall portion is nestingly located behind the joined front ends of the left and right lower frame sections and is formed so as to also have a substantially U-shaped configuration as viewed in top plan view, such that the front portion of the vertical wall portion is disposed proximate to the joined portion of the left and right lower frame sections.

* * * * *